United States Patent
Xu et al.

(10) Patent No.: US 12,444,193 B2
(45) Date of Patent: Oct. 14, 2025

(54) TARGET OBJECT RECOGNITION

(71) Applicant: Shanghai Hode Information Technology Co., Ltd., Shanghai (CN)

(72) Inventors: Baohan Xu, Shanghai (CN); Peiyi Li, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 348 days.

(21) Appl. No.: 18/131,993

(22) Filed: Apr. 7, 2023

(65) Prior Publication Data

US 2023/0281990 A1 Sep. 7, 2023

Related U.S. Application Data

(63) Continuation of application No. PCT/CN2021/120387, filed on Sep. 24, 2021.

(30) Foreign Application Priority Data

Dec. 22, 2020 (CN) .......................... 202011529196.5

(51) Int. Cl.
*G06V 20/40* (2022.01)
*G06T 7/174* (2017.01)
*G06V 10/40* (2022.01)

(52) U.S. Cl.
CPC .............. *G06V 20/46* (2022.01); *G06T 7/174* (2017.01); *G06V 10/40* (2022.01); *G06T 2207/30242* (2013.01)

(58) Field of Classification Search
CPC ........ G06V 20/46; G06V 10/40; G06V 10/80; G06V 20/635; G06V 30/147; G06V 20/00;

(Continued)

(56) References Cited

U.S. PATENT DOCUMENTS

2018/0213147 A1 7/2018 Miyamoto

FOREIGN PATENT DOCUMENTS

| CN | 105678732 A | 6/2016 |
|----|-------------|--------|
| CN | 106092114 A | 11/2016 |

(Continued)

OTHER PUBLICATIONS

International Search Report with a mailing date of Oct. 27, 2021, in International application No. PCT/CN2021/120387, filed on Sep. 24, 2021 (4 pages).

(Continued)

*Primary Examiner* — Jonathan A Boyd
(74) *Attorney, Agent, or Firm* — MCANDREWS HELD & MALLOY, LTD

(57) ABSTRACT

A target object recognition method is provided. The method includes: inputting a received initial picture into a first detection model, and obtaining an initial location of each target object in the initial picture; inputting a candidate picture corresponding to the initial location into a second detection model, and obtaining a verification object in the candidate picture and a verification location of the verification object in the candidate picture; adjusting the initial location of each target object based on the verification location to obtain a target location of each target object; and inputting a target picture corresponding to the target location into a recognition model to obtain each target object in the initial picture.

15 Claims, 6 Drawing Sheets

(58) Field of Classification Search
CPC ...... G06V 20/40; G06V 30/153; G06V 30/10; G06V 2201/07; G06T 7/174; G06T 2207/30242; G06T 7/11; G06T 7/70; G06T 2207/20081; G06T 2207/20084; G06N 3/08; G06N 3/045; G06F 18/214
See application file for complete search history.

(56) References Cited

FOREIGN PATENT DOCUMENTS

| | | | | |
|---|---|---|---|---|
| CN | 108769821 | A | | 11/2018 |
| CN | 109145784 | A | | 1/2019 |
| CN | 109977941 | A | | 7/2019 |
| CN | 110267116 | A | | 9/2019 |
| CN | 110781881 | A | | 2/2020 |
| CN | 111027563 | A | | 4/2020 |
| CN | 111405360 | | * | 7/2020 ....... H04N 21/44008 |
| CN | 111405360 | A | | 7/2020 |
| CN | 111414948 | | * | 7/2020 ............... G06T 7/70 |
| CN | 111414948 | A | | 7/2020 |
| CN | 111553356 | A | | 8/2020 |
| CN | 111672123 | A | | 9/2020 |
| CN | 112560728 | A | | 3/2021 |

OTHER PUBLICATIONS

Jie, Ding et al., "Research on Video Text Recognition Technology Based on OCR," 2018 10th International Conference on Measuring Technology and Mechatronics Automation, Downloaded on Apr. 3, 2023 at 07:34:40 UTC from IEEE Xplore (6 pages).

Yang, Chun, "Text Recognition from Complex Scenes," China Academic Journal Electronic Publishing House, Dec. 22, 2017 (126 pages).

Anthimopoulos, Marios, et al., "A two-stage scheme for text detection in video images," Image and Vision Computing, 28 (2010) 1413-1426 (14 pages).

* cited by examiner

| Score 1 | Score 2 | Score 3 | Score 4 |
|---------|---------|---------|---------|
| 0 VS 0 | 🖐 0 | ◯ 0 | ✊ 0 |
| Initial location 1 | Initial location 2 | Initial location 3 | Initial location 4 |

FIG. 3

TARGET OBJECT RECOGNITION

CROSS-REFERENCE TO RELATED APPLICATIONS

This application is a continuation under 35 U.S.C. 111(a) of PCT International Application No. PCT/CN2021/120387, filed on Sep. 24, 2021, which claims priority to Chinese Patent Application No. 202011529196.5, filed on Dec. 22, 2020, the entire contents of which are hereby incorporated by reference in their entirety for all purposes.

TECHNICAL FIELD

This application relates to computer technologies, and in particular, to target object recognition.

BACKGROUND

With popularity and development of the Internet and mobile devices (such as a mobile phone and a tablet computer), requirements for various entertainment activities on the mobile devices increase day by day. For example, people browse web pages, watch videos, and participate in games on mobile phones or other mobile devices. A user often hopes to clip an exciting moment related to the user in a game or a competition, such as kill or assist. In addition, a video website also hopes to recognize goals or other important information for displaying and attracting users.

SUMMARY

Some embodiments of this application provide a target object recognition method, a computing device, and a non-transitory computer-readable storage medium.

According to a first aspect of the embodiments of this application, a method is provided, including:
  inputting a received initial picture into a first detection model to obtain an initial location of each of one or more target objects in the initial picture;
  inputting a candidate picture corresponding to the initial location into a second detection model to obtain a verification object in the candidate picture and a verification location of the verification object in the candidate picture;
  adjusting the initial location of each of the one or more target objects based on the verification location to obtain a target location of each of the one or more target objects; and
  inputting a target picture corresponding to the target location into a recognition model to obtain the one or more target objects in the initial picture.

According to a second aspect of the embodiments of this application, a computing device is provided, which includes a processor; and a memory, wherein the memory stores computer executable instructions that, when executed by the processor, cause the processor to perform the above method.

According to a third aspect of the embodiments of this application, a non-transitory computer-readable storage medium is provided, where the non-transitory computer-readable storage medium stores computer instructions that, when executed by a processor, cause the processor to perform the above method.

BRIEF DESCRIPTION OF DRAWINGS

FIG. 3 is a schematic diagram of an initial picture in a target object recognition method according to some embodiments of this application;

DETAILED DESCRIPTION OF EMBODIMENTS

Figure 1:
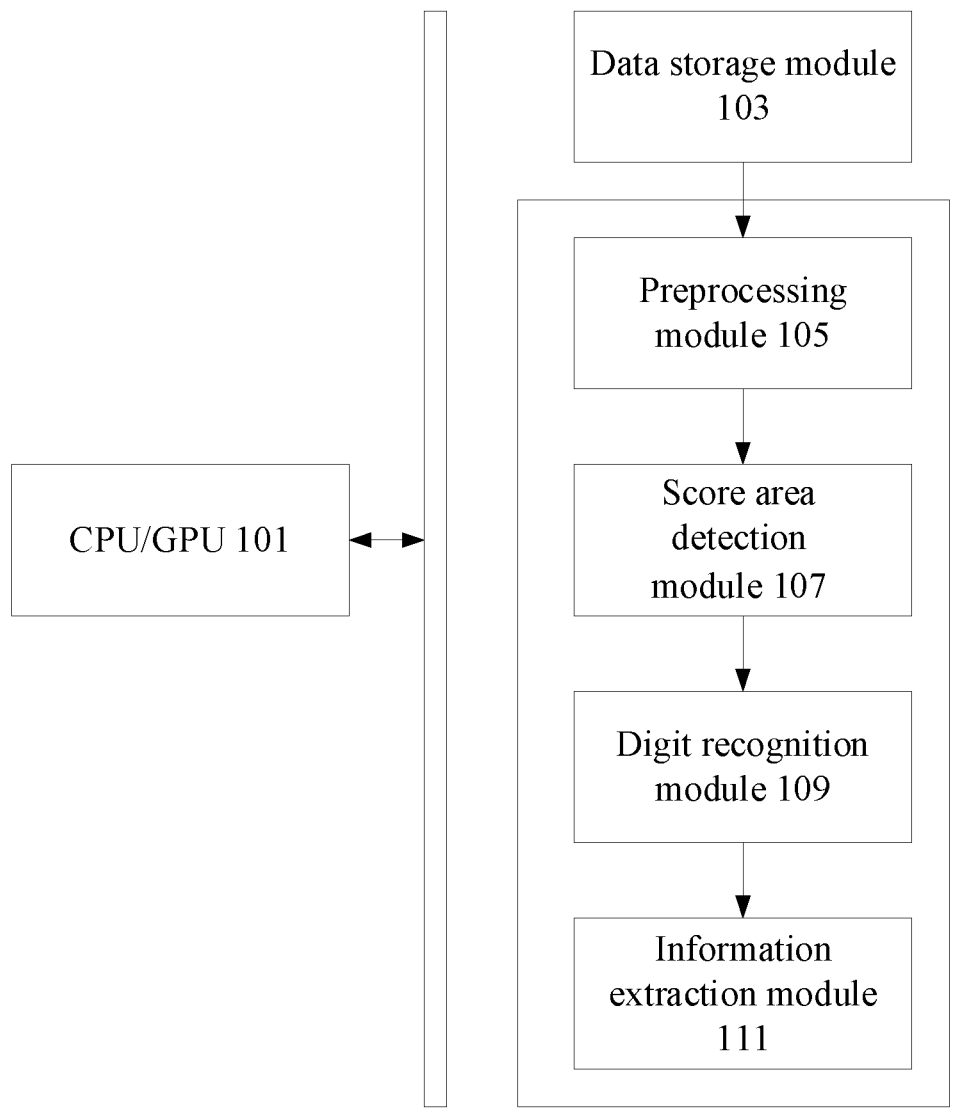
FIG. 1 is a schematic diagram of an application structure of a target object recognition method according to some embodiments of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

Template matching: Template matching is a technology of searching for a most similar part in one picture to another template picture usually according to a conventional picture processing method such as a sliding window.

Target detection: Target detection refers to finding all interested targets in a picture based on template matching or a neural network.

OCR: Optical character recognition refers to a process of performing analysis and recognition processing on a picture file of a text material, and obtaining text and layout information.

MobileNet: The MobileNet is a lightweight network.

SSD: The single shot multibox detector is a target detection algorithm.

Faster-RCNN: The Faster-RCNN is a convolutional neural network (CNN) target detection method, and is a fully end-to-end CNN object detection model.

Logo: The logo is a design name and refers to a symbol designed for a product, business, website, or the like for its own theme or activity.

In the related art, in a game picture or a game video, important information such as a game role and a kill prompt usually needs to be extracted. Because a user is often more concerned about information about the user, to locate whether information is such information, another key part, such as a game character used by the user, often needs to be recognized. Usually, the important information is extracted based on template matching, a classification algorithm, or the like. However, recognition based on the game role and the kill prompt is usually applied to the game picture or the game video. In this recognition method, features of all roles need to be obtained during initial use to distinguish between different information. Because a new role or skin is frequently introduced during game update, a recognition model needs to be frequently updated, which greatly increases model update and labor costs. If the model is not updated in time, accuracy of game role and kill recognition is extremely low.

In a picture or a video of another competition type, important information such as a score is extracted. Usually, a template matching method is used to recognize a score area, and the important information in the picture or the video is positioned based on a score change. However, different from the foregoing role and kill prompt recognition, score recognition for a competition can be applied to a poster and a video in a plurality of application scenarios such as a game and a competition, and role information does not need to be collected to adjust a model. However, when a template matching method commonly used by a target faces a complex picture or video, it is difficult to accurately position a score. In addition, when the important information is recognized, false recognition is often caused due to a complex background, which brings poor user experience.

To facilitate processing of a picture and a video, important information (for example, a score in a competition) in the picture or the video needs to be recognized. However, in the related art, a method for recognizing important information in a picture or a video cannot be well adapted to various application scenarios, and recognition accuracy is low.

Based on this, this application provides a target object recognition method, a computing device, and a non-transitory computer-readable storage medium to resolve a technical disadvantage in the related art that there is a low accuracy in recognition for important information in a picture or a video. Details are described one by one in the following embodiments.

FIG. 1 is a schematic diagram of an application structure of a target object recognition method according to some embodiments of this application.

A video processing method provided in this embodiment of this application is applied to a computer, a server, or a cloud service. An application scenario in FIG. 1 includes a central processing unit (CPU)/graphics processing unit (GPU) 101, a data storage module 103, a preprocessing module 105, a score area detection module 107, a digit recognition module 109, and an information extraction model 111. The CPU/GPU 101 starts to work, obtains a to-be-processed video or a picture stored in the data storage module 103, then, controls the preprocessing module 105 to extract a key frame in the to-be-processed video that needs to be recognized, and preprocesses the picture or the key frame based on an input requirement of the score area detection module 107. Then, the picture or the key frame is input into the score area detection module 107, and the score area detection module 107 detects and assists in positioning a score area in the picture or the key frame. Next, a final score area in the picture or the key frame is input into the digit recognition module 109, and the digit recognition module 109 detects a digit in the score area to recognize the digit in the score area. Finally, the digit in the score area is input into the information extraction module 111. The information extraction module 111 post-processes the recognized digit in the score area, to obtain an overall score recognition result of the picture or the to-be-processed video, and performs structural processing on the overall score recognition result, to display and recommend the overall score recognition result to the user.

According to the target object recognition method provided in this application, a lightweight neural network model is used to replace template matching in the related art to detect the score area in the video or the picture. Further, that a specific logo location is used to assist in accurate positioning of the score area is also proposed. In this way, the score area can be quickly and accurately extracted for pictures or videos in different layouts in different scenarios. In addition, when a digit in the score area is recognized, the digit in the score area can also be accurately recognized based on the lightweight neural network model.

Figure 2:
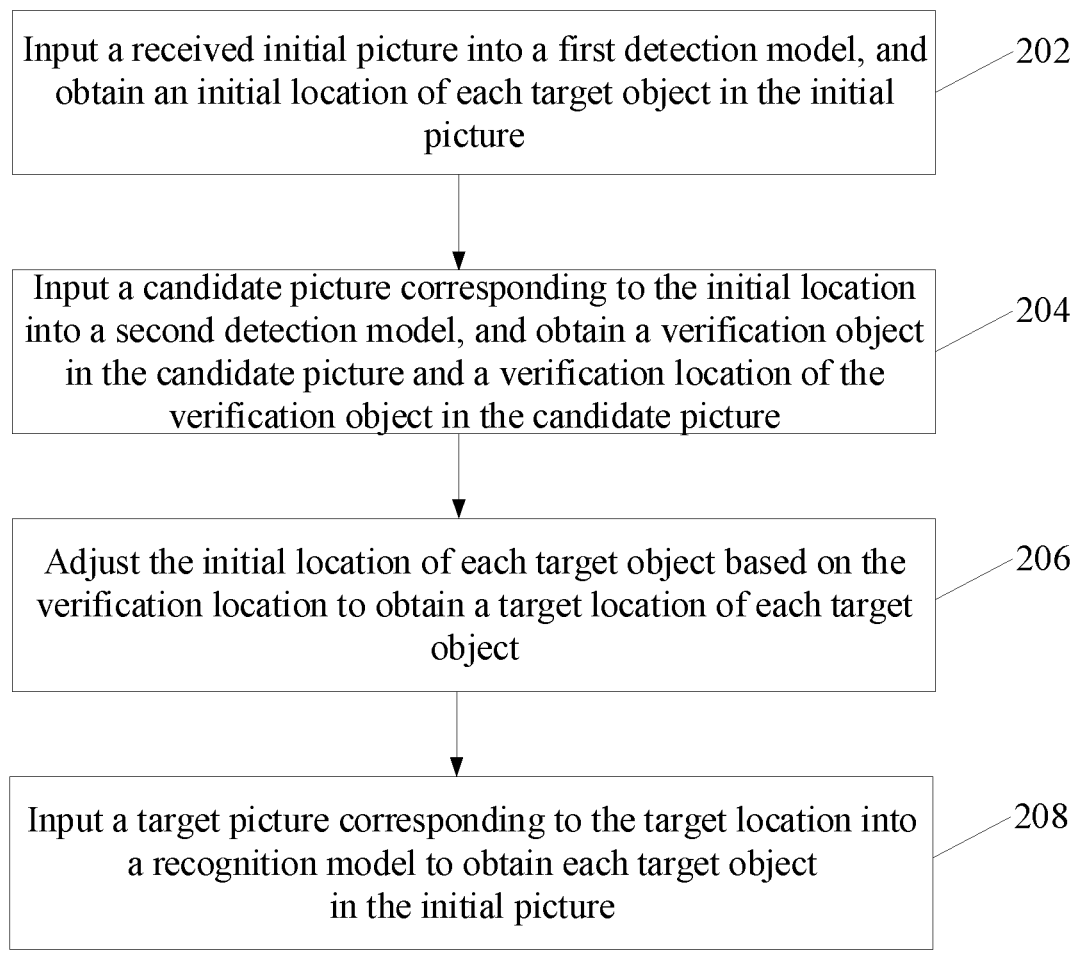
FIG. 2 is a flowchart of a target object recognition method according to some embodiments of this application.

FIG. 2 is a flowchart of a target object recognition method according to some embodiments of this application. The following steps are included:

Step 202: inputting a received initial picture into a first detection model, and obtaining an initial location of each target object in the initial picture.

The target object recognition method provided in this application may be applied to a game scenario to recognize a game score, or may be applied to an entertainment competition scenario to recognize a competition score, or may be applied to another application scenario in which a score needs to be recognized. This is not limited in this application. For ease of understanding, in the following embodiments of this application, the target object recognition method is applied to the game scenario, and score recognition in a game competition is described in detail.

The initial picture includes but is not limited to a picture of any type and of any content, for example, a game picture, a competition picture, or a picture formed by a video frame in a video. The target object may be understood as a score.

In an exemplary implementation, the received initial picture is input into the first detection model, and initial locations of one or more scores in the initial picture are obtained by using the first detection model. The first detection model includes but is not limited to a MobileNet-based SSD model. A MobileNet is a lightweight network applicable to a mobile terminal. An SSD is a one-stage detection network, and is faster than two-stage detection networks such as a Faster-RCNN.

FIG. 3 is a schematic diagram of an initial picture in a target object recognition method according to some embodiments of this application.

FIG. 3 shows a game picture in a game scenario, and the game picture includes scores in a game competition, such as an individual score and a team score.

In actual application, after the game picture is input into a MobileNet-based SSD model, initial locations of various scores in the game picture may be obtained, for example, in FIG. 3, an initial location 1 of a score 1, an initial location 2 of a score 2, an initial location 3 of a score 3, and an initial location 4 of a score 4.

Step 204: inputting a candidate picture corresponding to the initial location into a second detection model, and obtaining a verification object in the candidate picture and a verification location of the verification object in the candidate picture.

The first detection model and the second detection model may be detection models of a same type or detection models of different types. In actual application, the first detection model is used to recognize a score location. Therefore, during model training, a training sample used by the first detection model is a game picture, and a corresponding label is a score location in the game picture. In actual application, there is usually a logo icon next to each score, and the logo icon is used to indicate a meaning of the score, for example, an individual score, a team score, or a kill score. Correspondingly, the second detection model is used to recognize the logo icon next to the score location in the game picture output by the first detection model. During model training, a training sample used by the second detection model is a game picture that includes the score, and a corresponding label is the logo icon corresponding to each score and a location of the logo icon.

In an exemplary implementation, when the initial location of each target object is obtained, the candidate picture corresponding to the initial location of each target object is input into the second detection model, and a logo icon corresponding to the target object and a verification location of the logo icon corresponding to the target object are obtained in the candidate picture by using the second detection model.

FIG. 3 is still used as an example. After the initial location 1 of the score 1, the initial location 2 of the score 2, the initial location 3 of the score 3, and the initial location 4 of the score 4 are obtained, pictures in FIG. 3 corresponding to the initial location 1, the initial location 2, the initial location 3, and the initial location 4 are input into the second detection model. "VS" and a location of "VS" in an area of the initial location 1, a "knife" and a location of the "knife" in an area of the initial location 2, a "circle" and a location of the "circle" in an area of the initial location 3, and a "fist" and a location of the "fist" in an area of the initial location 4 may be obtained by using the second detection model.

Step 206: adjusting the initial location of each target object based on the verification location to obtain a target location of each target object.

After the verification location is obtained, the initial location of each corresponding target object is adjusted by using the verification location, to obtain the target location of the target object, so that during subsequent recognition of the target object, the target object can be accurately recognized based on the accurate target location.

In actual application, the verification location is a location of a logo icon adjacent to the target object. Therefore, a target location of each corresponding target object can be adjusted based on the location of the logo icon. In some embodiments, a specific target location of the score is positioned by using a location of the logo and an initial location of the score area. This is more accurate and quicker than slicing an initial location of a large score area recognized by using the first detection model. In addition, a determined accurate score location facilitates subsequent recognition of a digit in the score location.

Step 208: inputting a target picture corresponding to the target location into a recognition model to obtain each target object in the initial picture.

The recognition model includes but is not limited to a multi-label classification model. The multi-label classification model may use a lightweight network that is suitable for a mobile terminal, for example, the MobileNet. A classification label output by the classification model includes a quantity of digits and a specific category of each digit (0 to 9). For example, if a target object in a target location is a score 21, after a target picture in the target location that includes the target object is input into the recognition model, the recognition model outputs [2, 2, 1], where a first digit 2 represents that the score is a two-digit number, a second digit 2 represents that a first digit of the score is 2, and a third digit 1 represents that a second digit of the score is 1. By using this multi-label classification model, a number in an indeterminate quantity of digits can be determined, and a background category including no digit can be also recognized. In this case, when the background category including no digit is recognized, a quantity of digits of a score is 0.

In an exemplary implementation, one initial picture includes a plurality of target objects, and each target object corresponds to one initial location. Then, a candidate picture corresponding to the initial location of each target object is input into the second detection model, and a verification object in the candidate picture corresponding to the initial location of the target object and a verification location of the verification object in the candidate picture can be obtained. Next, accuracy adjustment is performed on the initial location of each corresponding target object based on the verification location, to obtain a target location of each target object. Finally, a target picture corresponding to each target location is input into the recognition model, and a target object in the target picture corresponding to each target location can be obtained. Target objects in target pictures corresponding to all target locations are aggregated, and all target objects in the initial picture can be determined.

In some embodiments of this application, the target object recognition method, through detecting for a plurality of times and by using logo-assisted positioning, can accurately position the score area, identify positioning, improve an accurate location of the target object, and implement pixel-level control of the target object. In addition, by using the lightweight network model, the mobile terminal quickly extracts and recognizes a target object in a picture or a video for various types of pictures or videos in complex and diverse versions.

In actual application, the initial picture may be a video frame in the video. When the initial picture is a video frame in the video, before the received initial picture is input into the first detection model, the method further includes:

receiving a to-be-processed video, and extracting i video frames from the to-be-processed video based on a preset extraction rule as initial pictures, where i∈[1, n], and i is a positive integer.

The preset extraction rule may be set based on actual application. For example, one video frame is extracted at an interval of one second, two seconds, or three seconds as an initial picture, or each video frame in the video is scored by using a scoring model of a video frame, and a video frame with a high score is used as an initial picture.

Before the received initial picture is inputted into the first detection model, the to-be-processed video is received. Then, the i video frames are extracted from the to-be-processed video based on the preset extraction rule as initial pictures, where i belongs to 1 to n, and i is a positive integer. For example, when i is 5, 5 video frames are extracted from the to-be-processed video based on the preset extraction rule as initial pictures.

In this embodiment of this application, the target object recognition method can be applied to recognize a target object of the video. Some video frames in the to-be-processed video are used as initial pictures, to accurately recognize a target object in the video frame of the to-be-processed video.

In another embodiment of this application, inputting a received initial picture into a first detection model, and obtaining an initial location of each target object in the initial picture includes:

inputting a received $i^{th}$ initial picture into the first detection model, and obtaining an initial location of each target object in the $i^{th}$ initial picture.

Correspondingly, inputting a target picture corresponding to the target location into a recognition model to obtain the target object in the initial picture includes:

inputting the target picture corresponding to the target location into the recognition model to obtain each target object in the $i^{th}$ initial picture; and determining whether i is greater than n, and if yes, counting each target object in each initial picture, or if no, increasing i by 1, and inputting a received $i^{th}$ initial picture into the first detection model continually.

When the initial picture is several video frames in the to-be-processed video, each target object in each initial picture are recognized based on the target object recognition method in this application.

For example, i is 1. First, a received first initial picture is input into the first detection model, and an initial location of each target object in the first initial picture is obtained. A candidate picture corresponding to the initial location of each target object in the first initial picture is input into the second detection model, to obtain a verification object in the candidate picture and a verification location of the verification object in the candidate picture. The initial location of each target object is adjusted based on the verification location to obtain a target location of each target object. A target picture corresponding to the target location is input into the recognition model to obtain all target objects in the first initial picture. When all the target objects in the first initial picture are obtained, it is determined whether the first initial picture is the last initial picture in the to-be-processed video, that is, whether i is greater than n. If yes, all the target objects in the first initial picture are counted. If no, the second initial picture is input into the first detection model, and the foregoing steps are continually performed until all target objects in each initial picture formed by the video frame extracted from the to-be-processed video are recognized.

After all target objects in all initial pictures are recognized, all the target objects in all the initial picture are counted. The foregoing example is still used. For example, scores in all game pictures, such as an individual score, a team score, and a kill score, are counted.

For a recognition manner of each target object in the initial picture formed by each video frame extracted from the to-be-processed video, references may be made to recognition steps of a target object in a single initial picture in the foregoing embodiments. Details are not described herein.

In this embodiment of this application, in addition to recognizing each target object in the single initial picture, the target object recognition method can also recognize each target object in each initial picture formed by a key frame extracted from the to-be-processed video. The target object in each key frame is recognized through detecting for a plurality of times and by using logo-assisted positioning. This can accurately position the score area, identify positioning, improve an accurate location of the target object, and implement pixel-level control of the target object. In addition, by using the lightweight network model, the mobile terminal quickly extracts and recognizes a target object in a video for various types of videos in complex and diverse versions.

In addition, the inputting a received $i^{th}$ initial picture into the first detection model, and obtaining an initial location of each target object in the $i^{th}$ initial picture includes:

inputting the received $i^{th}$ initial picture into the first detection model;

determining whether the $i^{th}$ initial picture includes a target object; and if yes, obtaining an initial location of each target object in the $i^{th}$ initial picture, or if no, increasing i by 1, and inputting a received $i^{th}$ initial picture into the first detection model continually.

In actual application, the video frame extracted from the to-be-processed video may include no target object. For example, in a game video, a video frame at the beginning of the game video is an introduction to a game. Because the game does not start, there is no target object score in these video frames.

To avoid useless work, after each initial picture is received, whether each initial picture includes a target object is detected. If the initial picture includes no target object, a target object in a next initial picture is continued to be detected. This avoids waste of system processing resources and poor experience for a user due to a case in which subsequent operations such as location obtainment and target object recognition are also performed on the initial picture including no target object.

In an exemplary implementation, when a target object in an initial picture is shielded, the recognition model may recognize a background picture shielding the target object in the initial picture, but cannot correctly recognize the specific target object. To meet actual application to recognize all target objects in each initial picture, a target object of a previous initial picture of the initial picture may be used for replacement. An exemplary implementation is as follows:

The inputting the target picture corresponding to the target location into the recognition model to obtain each target object in the $i^{th}$ initial picture includes:

inputting the target picture corresponding to the target location into the recognition model, and if a picture background of the $i^{th}$ initial picture does not meet a predetermined condition, using each target object in an $(i-1)^{th}$ initial picture as each target object in the $i^{th}$ initial picture.

The predetermined condition includes but is not limited to that the target object can be detected or is not shielded.

In a game scenario, there may be a case in which a game role shields a score area in a moving process. In this case, it can be determined that a picture background of an initial picture does not meet the predetermined condition. In this case, a picture corresponding to a score location is input into the recognition model, and only the shielding game role, that is, the picture background, can be recognized in the recognition model. In this case, a score in a previous initial picture immediately adjacent to the initial picture is used as a score of the initial picture.

In this embodiment of this application, because there is continuity between initial pictures formed by video frames in the to-be-processed video, a difference between target objects in two initial pictures is usually not very large. To ensure that the target object in each initial picture is recognized, when the recognition model cannot recognize a target object in an initial picture, a target object in a previous initial picture immediately adjacent to the initial picture is used for replacement, to meet a subsequent requirement in actual application (for example, obtaining of a key initial picture based on a score) based on the target object in each initial picture.

In addition, after counting each target object in each initial picture, the method further includes:

when each target object in the $i^{th}$ initial picture does not meet a preset target object recognition rule, using each target object in an $(i-1)^{th}$ initial picture as each target object in the $i^{th}$ initial picture.

The preset target object recognition rule may be set based on an exemplary application scenario. This is not limited in this application. For example, in a game scenario, the target object is an individual score and a team score, and the preset target object recognition rule may include that the team score is greater than the individual score.

For example, i is 3. When each target object in the third initial picture does not meet the preset target object recognition rule, corresponding each target object in the second initial picture is used as each target object in the third initial picture.

The foregoing example is still used, that is, the game scenario is still used as an example. An initial picture of a game competition video includes an individual score and a team score, and the team score is necessarily not less than the individual score. If an individual score recognized in the third initial picture is greater than a team score thereof, it can be determined that the individual score and the team score in the third initial picture are incorrectly recognized. In this case, the individual score and the team score in the third initial picture need to be corrected, and an individual score and a team score in the second initial picture are used as the individual score and the team score in the third initial picture.

In this embodiment of this application, after the target object of each initial picture in the to-be-processed video is obtained, accuracy verification is performed, based on the preset target object recognition rule, on the target object recognized in each initial picture. When a target object recognized in an initial picture does not meet the preset target object recognition rule, it can be determined that recognition of the target object in the initial picture fails. In this case, to ensure recognition accuracy of the target object in each initial picture, the target object in the initial picture that fails to be recognized may be replaced with a recognition result of a target object in a previous initial picture of the initial picture.

In another embodiment of this application, in a game scenario or a competition scenario, scores in initial pictures extracted from a game video and a competition video are continuous. In other words, in a specific time window, the score in the initial picture does not change greatly. If the score in the initial picture sharply fluctuates in the specific time window, the score in the initial picture may be incorrectly recognized. In this case, a score in an initial picture needs to be corrected. An exemplary implementation is as follows:

After counting each target object in each initial picture, the method further includes:

dividing each target object in all initial pictures into at least one object sequence based on a preset time period;

using a target object that is in each object sequence and that does not meet a preset target object arrangement rule as an adjustment object; and adjusting the adjustment object based on each target object in an initial picture adjacent to an initial picture corresponding to the adjustment object.

The preset time period may be set based on an actual requirement. For example, the preset time period may be 5 seconds or 10 seconds.

For example, the preset time period is 5 seconds. All initial pictures in the to-be-processed video are obtained at an interval of 5 seconds, that is, target objects in all initial pictures in every 5 seconds are obtained. Then, it is determined whether arrangement of the target objects in all the initial pictures in every 5 seconds meets the preset target object arrangement rule. If yes, it is determined that the target objects in all the initial pictures in the 5 seconds are accurately recognized. If no, it is determined that there is an abnormal target object in the target objects in all the initial pictures in the 5 seconds. Then, a target object in an initial picture corresponding to the abnormal target object may be adjusted based on a target object in an initial picture adjacent to the initial picture corresponding to the abnormal target object. Median filtering may be used to adjust the target object.

The preset target object arrangement rule may be set based on an exemplary application scenario. This is not limited in this application. For example, in the game scenario, the preset target object arrangement rule may include that the target object progressively increases or remains unchanged based on competition time.

The foregoing example is still used. In the game scenario, based on an understanding of a person skilled in the art to a common game competition, the individual score and the team score in the initial picture either remain unchanged or progressively increase with time. For example, a preset time period is 5 seconds, and scores in initial pictures obtained in 5 seconds are arranged as [5, 5, 8, 5, 5]. In this case, it can be determined that a score in the third initial picture may be incorrectly recognized. A target object in the third initial picture needs to be adjusted based on a target object in the second initial picture and a target object in the fourth initial picture that are adjacent to the third initial picture. For example, the score in the third initial picture is corrected to 5 by median filtering.

In this embodiment of this application, after the target object in each initial picture is obtained by using the recognition model, accuracy of the target object in each initial picture may be determined based on change features of the target object in different application scenarios. When a target object in an initial picture is incorrectly recognized, the target object in the initial picture can be corrected by median filtering. This further ensures accuracy of the target object in the initial picture.

In another embodiment of this application, the target objects include a first target object and a second target object.

Correspondingly, after counting each target object in each initial picture, the method further includes:

receiving an obtaining request for the first target object, and determining a first target object and a second target object in each initial picture based on the obtaining request, where the second target object is associated with the first target object; and when the second target object in each initial picture is updated based on an increase of the first target object, displaying the first target object in each initial picture.

The foregoing example is still used. In the game scenario, the target object is a score, the first target object is the individual score, and the second target object is the team score. In a game, the user is concerned about a kill moment implemented by the user. After the individual score and the team score in each initial picture are recognized and filtered, when an individual kill score in each initial picture increases, a team kill score thereof increases accordingly. Therefore, the individual kill score and the team kill score in each initial picture can be comprehensively determined, and an incorrectly recognized score is filtered. Finally, correct individual kill information can be returned to the user.

In this embodiment of this application, when the user is concerned about a target object, accuracy of the target object concerned by the user can be recognized by using an association relationship between the target object in an initial picture and another target object, to filter and adjust an incorrectly recognized target object. Finally, the target object concerned by the user is accurately displayed. This can greatly improve user experience.

In this embodiment of this application, the method further includes:

extracting each target object from the initial picture, and using an initial picture including a target object meeting a preset extraction condition as a target initial picture; and generating a target video based on the target initial picture, and sending the target video to a user.

The preset extraction condition may be set based on actual application. For example, the preset extraction condition is that the target object is greater than or equal to a preset target object threshold, that is, the score needs to be greater than a specified score or a specified threshold.

In an exemplary implementation, after each target object in each initial picture is filtered, recognized, and adjusted in the foregoing various manners, some initial pictures including target objects meeting the preset extraction condition are selected from all initial pictures as target pictures, and then these target pictures are generated into a target video to be sent to the user.

The foregoing example is still used. If the preset extraction condition is that the individual score is greater than 80 points, initial pictures in which an individual score is greater than 80 points are extracted from the initial pictures as target pictures. Then, these target pictures are generated into video highlights to be recommended to the user.

In this embodiment of this application, after each target object in each initial picture is obtained, a target video and the like in which the user is interested can be generated based on an actual application requirement, to improve user attention to the video.

Figure 4:
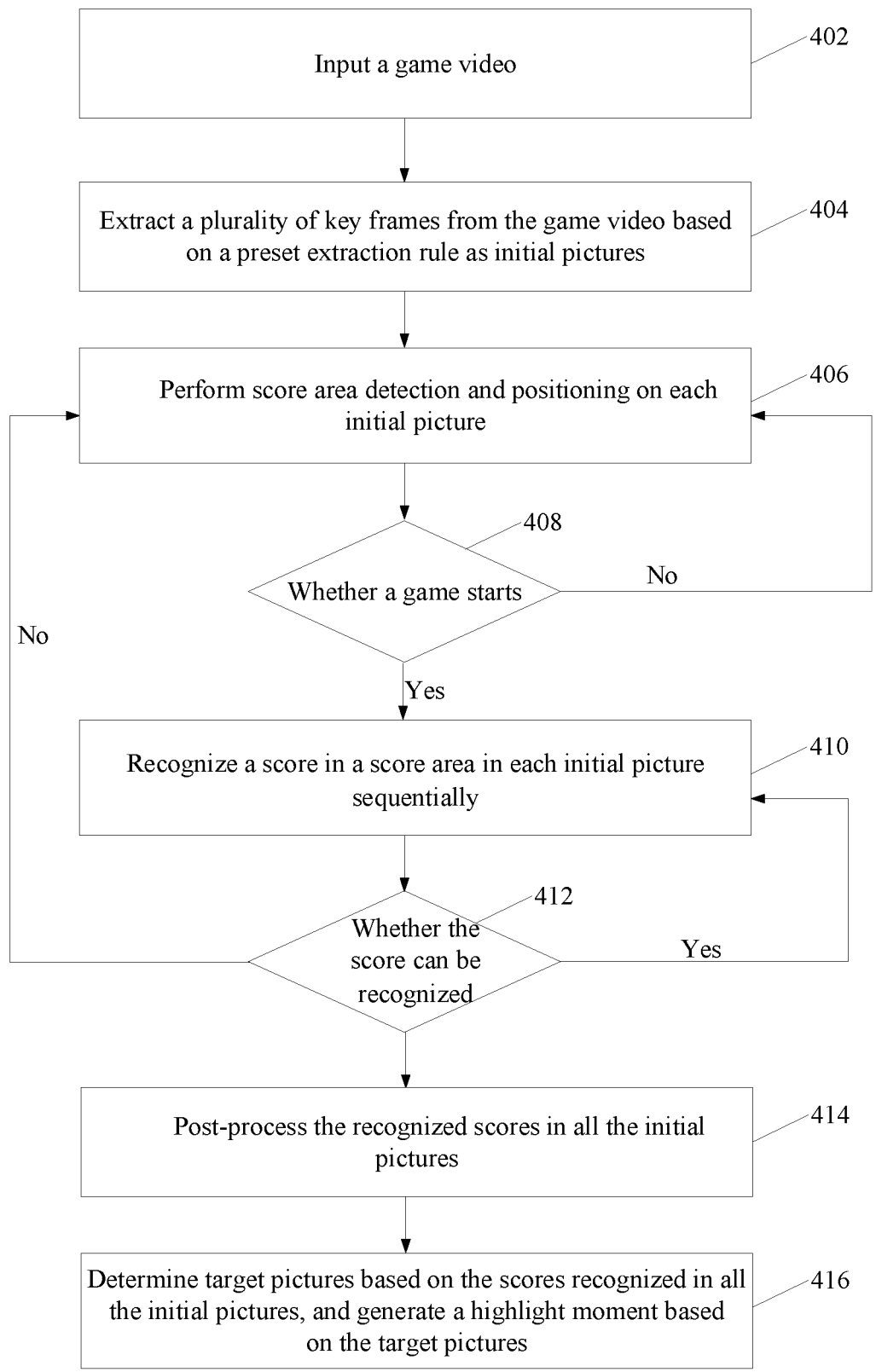
FIG. 4 is a flowchart of a target object recognition method being applied to a game competition scenario according to some embodiments of this application.

In the following, with reference to FIG. 4, the target object recognition method is further described by using an example in which the target object recognition method provided in this application is applied to a game competition scenario. The following steps are included:

Step 402: inputting a game video.

Step 404: extracting a plurality of key frames from the game video based on a preset extraction rule as initial pictures.

Step 406: performing score area detection and positioning on each initial picture.

The score area detection is key area detection. A key area is an area that includes important information in a picture or a video and that is often concerned by a user. For example, in poster pictures and videos of a game competition and a real competition (a football competition or a basketball competition), the user tends to be concerned about a specific score area. Currently, a resolution, a size, a layout, and an interface of the picture or the video usually vary greatly. Consequently, it is difficult to use template matching in the related art to perform key area positioning. In addition, to meet a requirement that a mobile terminal needs to implement rapid detection of the key area in the picture or the video, a lightweight detection model, that is, a MobileNet-based SSD model, is used in this application. A MobileNet is a lightweight network applicable to the mobile terminal. An SSD is a one-stage detection network model, and is faster than two-stage detection networks such as a Faster-RCNN.

However, the lightweight detection model is fast, but accuracy is often affected. A deviation may occur in positioning a score area, which affects subsequent score digit recognition. To resolve this problem, this application further detects an iconic logo in each picture or each video frame. In videos on different interfaces, a location of the logo is used to assist in score area positioning. A specific location of each score area that needs to be recognized in the picture or the video is obtained by detecting and assisting to position the score area, and then is input into a subsequent recognition model for score recognition.

Step 408: determining whether the game starts; and if yes, performing step 410, or if no, continuing to perform step 406.

In an exemplary implementation, a server determines, by detecting the score area in each initial picture, whether the game starts. For example, if no score area is detected in the initial picture, the server can determine that the game does not start. If the score area is detected in the initial picture, the server can determine that the game starts. In this case, recognition can be performed on a score in the initial picture of the game competition.

Step 410: recognizing a score in the score area in each initial picture sequentially. For a score recognition task, currently, many LSTM-based and CTC-based character recognition technologies are commonly used. However, using of these technologies by the mobile terminal is time consuming, which affects user experience. For a feature of lightweight digit recognition, a multi-label classification model is used in this application. A backbone network of the classification model may use a lightweight network that is suitable for the mobile terminal, for example, the MobileNet. A classification label includes a quantity of digits and a specific category of each digit (0 to 9). For example, for a score 21, the recognition model outputs [2, 2, 1], where the first digit 2 represents that the score is a two-digit number, the second digit 2 represents that the first digit of the score is 2, and the third digit 1 represents that the second digit of the score is 1. According to this multi-label classification method, a number in an indeterminate quantity of digits can be determined, and a background category including no digit can be also recognized. When the background category including no digit is recognized, a quantity of digits can be set to 0.

Step 412: determining whether the score can be recognized; and if yes, performing step 410, or if no, performing step 406.

When the score in the score area in each initial picture is recognized, it needs to be determined whether the score in the initial picture can be recognized. If yes, a score in a next initial picture is continued to be recognized until scores in all initial pictures are recognized. If no, the score area in the initial picture is re-positioned, and a score area is re-recognized, to ensure that scores in all the initial pictures are recognized. After the scores in all the initial pictures are recognized, step 414 is performed.

Step 414: post-processing the recognized scores in all the initial pictures.

With reference to the foregoing embodiments, after the scores in all the initial pictures are obtained, post-processing such as background filtering, rule filtering, median filtering, and comprehensive score determining may be performed, to determine accuracy of the recognized scores.

In an exemplary implementation, post-processing of a score is mainly for a scenario in which the target object in the video is recognized. Because a video background is complex, it is difficult to ensure 100% accuracy of score recognition.

However, in a video segment, a score changes continuously when a game is in progress. Therefore, after video scores are integrated, the present invention further proposes a corresponding post-processing method:

Background filtering: Because a digit recognition model recognizes a score or a background, when a background is recognized in a frame, a score area in the frame may fails to be recognized due to shielding or another reason, and the frame may follow a score in a previous frame.

Rule filtering: In a game competition or a real competition, scores usually include a rule, for example, that a team score is greater than an individual score. For different scenarios, when a score does not conform to a rule of the game competition or the real competition, it can be considered that the score in this frame is incorrectly recognized. In this case, the incorrect score can be replaced by a score in a previous frame.

Median filtering: Because a score in a game competition or a real competition continuously changes, the score may also be filtered by median filtering, that is, in a time window, a median of adjacent scores is used to replace an original score. This method can effectively filter a single abnormal value, and smooth overall scores. For example, when the time window is 5, and the adjacent scores are [5, 5, 8, 5, 5], a score 8 in the third frame that is incorrectly recognized may be corrected to 5 by median filtering.

Comprehensive score determining: Finally, when a concerned target score changes, this method comprehensively determines various scores and performs structured output. For example, for a game, a user is concerned about a kill moment implemented by the user, that is, an individual kill score. After score recognition filtering, when an individual kill quantity increases, a team kill quantity increases accordingly. Therefore, this algorithm comprehensively determines the individual kill score and the team kill score, filters false recognition, and finally returns a correct individual kill score to the user.

In actual application, based on different game competitions or real competitions and different focus points, the foregoing post-processing algorithm may also be adjusted accordingly, for example, changing a filtering rule and changing a size of a median filtering window.

Finally, after analysis of the picture or the video, important information included in the picture or the video can be determined by determining the score in the picture or a score in the video in an adjacent time period. After the information is structured (for example, the user performs a kill operation at a time point), the information is returned to the user or displayed directly.

Step 416: determining target pictures based on the scores recognized in all the initial pictures, and generating a highlight moment based on the target pictures.

According to the target object recognition method provided in this application, a lightweight neural network model is used to replace template matching in the related art to detect the score area in the video or the picture. Further, that a specific logo location is used to assist in accurate positioning of the score area is also proposed. In this way, the score area can be quickly and accurately extracted for pictures or videos in different layouts in different scenarios. In addition, when a digit in the score area is recognized, the digit in the score area can also be accurately recognized based on the lightweight neural network model.

Figure 5:
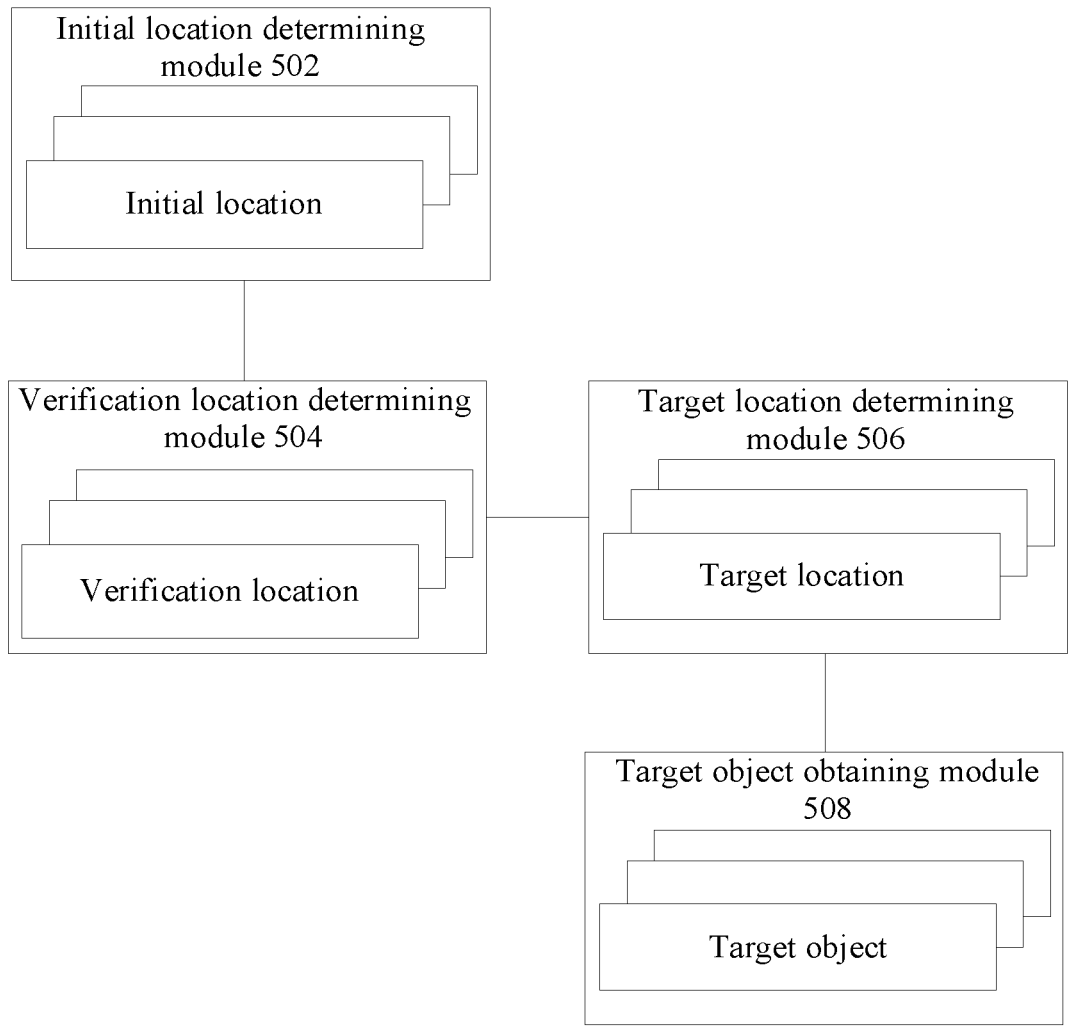
FIG. 5 is a schematic diagram of a structure of a target object recognition apparatus according to some embodiments of this application.

Corresponding to the foregoing method embodiments, this application further provides some embodiments of a target object recognition apparatus. FIG. 5 is a schematic diagram of a structure of a target object recognition apparatus according to some embodiments of this application. As shown in FIG. 5, the apparatus includes:

an initial location determining module 502, configured to input a received initial picture into a first detection model, and obtain an initial location of each target object in the initial picture;

a verification location determining module 504, configured to input a candidate picture corresponding to the initial location into a second detection model, and obtain a verification object in the candidate picture and a verification location of the verification object in the candidate picture;

a target location determining module 506, configured to adjust the initial location of each target object based on the verification location to obtain a target location of each target object; and a target object obtaining module 508, configured to input a target picture corresponding to the target location into a recognition model to obtain each target object in the initial picture.

According to some embodiments, the apparatus further includes:

a picture obtaining module, configured to receive a to-be-processed video, and extract i video frames from the to-be-processed video based on a preset extraction rule as initial pictures, where i∈[1, n], and i is a positive integer.

According to some embodiments, the initial location determining module 502 is further configured to:

input a received $i^{th}$ initial picture into the first detection model, and obtain an initial location of each target object in the $i^{th}$ initial picture.

Correspondingly, the target object obtaining module 508 is further configured to:

input the target picture corresponding to the target location into the recognition model to obtain each target object in the $i^{th}$ initial picture; and determine whether i is greater than n, and if yes, count each target object in each initial picture, or if no, increase i by 1, and input a received $i^{th}$ initial picture into the first detection model continually.

According to some embodiments, the initial location determining module 502 is further configured to:

input the received $i^{th}$ initial picture into the first detection model;

determine whether the $i^{th}$ initial picture includes a target object; and if yes, obtain the initial location of each target object in the $i^{th}$ initial picture, or if no, increase i by 1, and input a received $i^{th}$ initial picture into the first detection model continually.

According to some embodiments, the initial location determining module 502 is further configured to:

input the target picture corresponding to the target location into the recognition model, and if a picture background of the $i^{th}$ initial picture does not meet a predetermined condition, use each target object in an $(i-1)^{th}$ initial picture as each target object in the $i^{th}$ initial picture.

According to some embodiments, the apparatus further includes:

a first object adjustment module, configured to: when each target object in the $i^{th}$ initial picture does not meet a preset target object recognition rule, use each target object in an $(i-1)^{th}$ initial picture as each target object in the $i^{th}$ initial picture.

According to some embodiments, the apparatus further includes:

a second object adjustment module, configured to:

divide each target object in all initial pictures into at least one object sequence based on a preset time period;

use a target object that is in each object sequence and that does not meet a preset target object arrangement rule as an adjustment object; and adjust the adjustment object based on each target object in an initial picture adjacent to an initial picture corresponding to the adjustment object.

According to some embodiments, the apparatus further includes: a third object adjustment module.

The target objects include a first target object and a second target object.

Correspondingly, the third object adjustment module is configured to:

receive an obtaining request for the first target object, and determine a first target object and a second target object in each initial picture based on the obtaining request, where the second target object is associated with the first target object; and when the second target object in each initial picture is updated based on an increase of the first target object, display the first target object in each initial picture.

According to some embodiments, the apparatus further includes:

a target video generation module, configured to:

extract each target object from the initial picture, and use an initial picture including a target object meeting a preset extraction condition as a target initial picture; and generate a target video based on the target initial picture, and send the target video to a user.

In some embodiments of this application, the target object recognition apparatus, through detecting for a plurality of times and by using logo-assisted positioning, can accurately position a score area, identify positioning, improve an accurate location of the target object, and implement pixel-level control of the target object. In addition, by using a lightweight network model, a mobile terminal quickly extracts and recognizes a target object in a picture or a video for various types of pictures or videos in complex and diverse versions.

The foregoing describes a schematic solution of the target object recognition apparatus according to this embodiment. It should be noted that, the technical solution of the target object recognition apparatus and the technical solution of the target object recognition method belong to a same concept. For details not described in detail in the technical solution of the target object recognition apparatus, refer to the descriptions of the technical solution of the target object recognition method.

Figure 6:
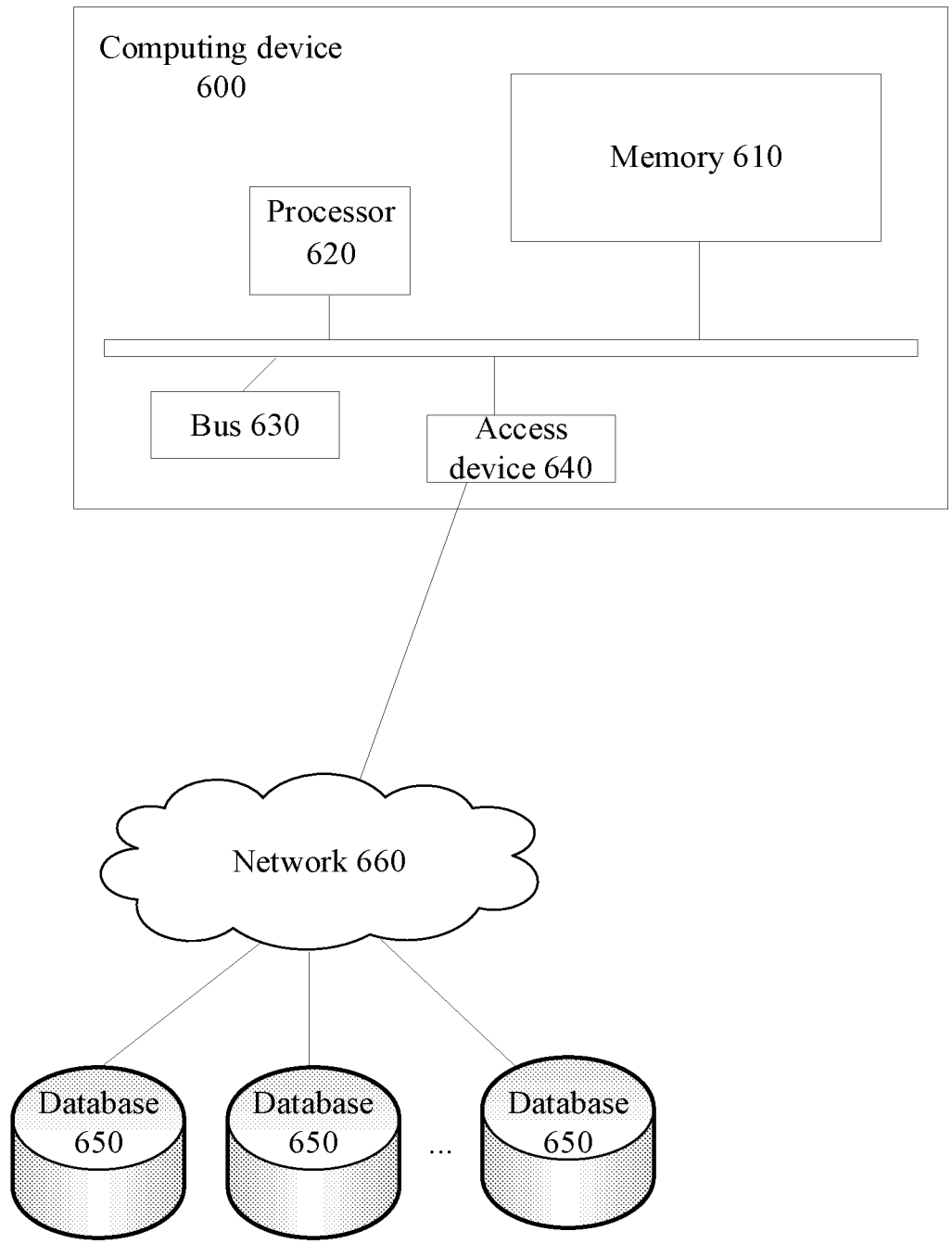
FIG. 6 is a block diagram of a structure of a computing device according to some embodiments of this application.

FIG. 6 is a block diagram of a structure of a computing device 600 according to some embodiments of this application. Components of the computing device 600 include but are not limited to a memory 610 and a processor 620. The processor 620 and the memory 610 are connected by using a bus 630, and a database 650 is configured to store data.

The computing device 600 further includes an access device 640 that enables the computing device 600 to communicate via one or more networks 660. Examples of these networks include a public switched telephone network (PSTN), a local area network (LAN), a wide area network (WAN), a private area network (PAN), or a combination of communication networks such as the Internet. The access device 640 may include one or more of any type of wired or wireless network interface (for example, a network interface card (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In some embodiments of this application, the foregoing components of the computing device 600 and other components not shown in FIG. 6 may alternatively be connected to each other, for example, by using the bus. It should be understood that, the block diagram of the structure of the computing device shown in FIG. 6 is merely used as an example instead of a limitation on the scope of this application. A person skilled in the art may add or replace other components as required.

The computing device 600 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a static computing device such as a desktop computer or a PC. The computing device 600 may alternatively be a mobile or static server.

The processor 620 is configured to execute the following computer executable instructions, and when the processor 620 executes the instructions, the steps of the target object recognition method are implemented.

The foregoing describes a schematic solution of the computing device in this embodiment. It should be noted that, the technical solution of the computing device and the technical solution of the target object recognition method belong to a same concept. For details not described in detail in the technical solution of the computing device, refer to the descriptions of the technical solution of the target object recognition method.

Some embodiments of this application further provide a computer-readable storage medium, where the computer-readable storage medium stores computer instructions, and when the instructions are executed by a processor, the steps of the target object recognition method are implemented.

The foregoing describes a schematic solution of the computer-readable storage medium in this embodiment. It should be noted that, the technical solution of the storage medium and the technical solution of the target object recognition method belong to a same concept. For details not described in detail in the technical solution of the storage medium, refer to the descriptions of the technical solution of the target object recognition method.

Some embodiments of this application further provide a computer program product, and when the computer program product is executed in a computer, the computer is enabled to perform the steps of the target object recognition method.

The foregoing describes a schematic solution of the computer program product in this embodiment. It should be noted that, the technical solution of the computer program product and the technical solution of the target object recognition method belong to a same concept. For details not described in detail in the technical solution of the computer program product, refer to the descriptions of the technical solution of the target object recognition method.

Exemplary embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program product code. The computer program product code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program product code. It should be noted that, content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the described embodiments in this application are all exemplary embodiments, and involved actions and modules are not necessarily mandatory to this application.

In the foregoing embodiments, descriptions of the embodiments have respective focuses. For a part that is not described in detail in some embodiments, refer to related descriptions in another embodiment.

The embodiments of this application disclosed above are merely intended to help describe this application. The optional embodiments do not describe all details, and the present invention is not limited to the specific implementations. Clearly, many modifications and changes may be made based on the content of this application. These embodiments are selected and described in this application to better explain the principle and the actual applications of this application, so that a person skilled in the art can better understand and use this application. This application is only subjected to the claims and the scope and equivalents thereof

What is claimed is:

1. A method, comprising:
   receiving a to-be-processed video;
   extracting i video frames from the to-be-processed video as initial pictures based on a preset extraction rule, wherein $i \in [1, n]$, and i is a positive integer;
   inputting a received initial picture into a first detection model to obtain an initial location of each of one or more target objects in the initial picture, comprising:
   inputting a received $i^{th}$ initial picture into the first detection model to obtain the initial location of each of the one or more target objects in the $i^{th}$ initial picture;
   inputting a candidate picture corresponding to the initial location into a second detection model to obtain a verification object in the candidate picture and a verification location of the verification object in the candidate picture;
   adjusting the initial location of each of the one or more target objects based on the verification location to obtain a target location of each of the one or more target objects; and
   inputting a target picture corresponding to the target location into a recognition model to obtain the one or more target objects in the initial picture, comprising:
   inputting the target picture corresponding to the target location into the recognition model to obtain the one or more target objects in the $i^{th}$ initial picture;
   determining whether i is greater than n;
   in response to determining that i is greater than n, counting the one or more target objects in each initial picture; and
   in response to determining that i is not greater than n, increasing i by 1, and continuing to input the received $i^{th}$ initial picture into the first detection model.

2. The method according to claim 1, wherein inputting the received $i^{th}$ initial picture into the first detection model to obtain the initial location of each of the one or more target objects in the $i^{th}$ initial picture comprises:
   inputting the received $i^{th}$ initial picture into the first detection model;
   determining whether the $i^{th}$ initial picture comprises the one or more target objects;
   in response to determining that the $i^{th}$ initial picture comprises the one or more target objects, obtaining the initial location of each of the one or more target objects in the $i^{th}$ initial picture; and
   in response to determining that the $i^{th}$ initial picture comprises no target object, increasing i by 1, and continuing to input the received $i^{th}$ initial picture into the first detection model.

3. The method according to claim 1, wherein inputting the target picture corresponding to the target location into the recognition model to obtain the one or more target objects in the $i^{th}$ initial picture comprises:
   inputting the target picture corresponding to the target location into the recognition model; and
   in response to determining that a picture background of the $i^{th}$ initial picture does not meet a predetermined condition, determining the one or more target objects in an $(i-1)^{th}$ initial picture as the one or more target objects in the $i^{th}$ initial picture.

4. The method according to claim 1, wherein the method further comprises: after counting the one or more target objects in each initial picture:
   in response to determining that the one or more target objects in the $i^{th}$ initial picture does not meet a preset target object recognition rule, determining the one or more target objects in an $(i-1)^{th}$ initial picture as the one or more target objects in the $i^{th}$ initial picture.

5. The method according to claim 1, wherein the method further comprises: after counting the one or more target objects in each initial picture:

dividing the one or more target objects in all initial pictures into at least one object sequence based on a preset time period;

determining a target object in each object sequence that does not meet a preset target object arrangement rule as an adjustment object; and adjusting the adjustment object based on one or more target objects in an initial picture adjacent to an initial picture corresponding to the adjustment object.

6. The method according to claim 1, wherein the one or more target objects comprise a first target object and a second target object; and wherein the method further comprises: after counting the one or more target objects in each initial picture:

receiving an obtaining request for the first target object;

determining the first target object and the second target object in each initial picture based on the obtaining request, wherein the second target object is associated with the first target object; and in response to updating the second target object in each initial picture based on an increase of the first target object, displaying the first target object in each initial picture.

7. The method according to claim 1, wherein the method further comprises:

extracting the one or more target objects from the initial picture;

determining an initial picture comprising a target object meeting a preset extraction condition as a target initial picture;

generating a target video based on the target initial picture; and sending the target video to a user.

8. A computing device, comprising:

a processor; and a memory, wherein the memory stores computer executable instructions that, when executed by the processor, cause the processor to:

receive a to-be-processed video;

extract i video frames from the to-be-processed video as initial pictures based on a preset extraction rule, wherein $i \in [1, n]$, and i is a positive integer;

input a received initial picture into a first detection model to obtain an initial location of each of one or more target objects in the initial picture, comprising:

inputting a received $i^{th}$ initial picture into the first detection model to obtain the initial location of each of the one or more target objects in the $i^{th}$ initial picture;

input a candidate picture corresponding to the initial location into a second detection model to obtain a verification object in the candidate picture and a verification location of the verification object in the candidate picture;

adjust the initial location of each or the one or more target objects based on the verification location to obtain a target location of each of the one or more target objects; and input a target picture corresponding to the target location into a recognition model to obtain the one or more target objects in the initial picture, comprising:

inputting the target picture corresponding to the target location into the recognition model to obtain the one or more target objects in the $i^{th}$ initial picture;

determining whether i is greater than n;

in response to determining that i is greater than n, counting the one or more target objects in each initial picture; and in response to determining that i is not greater than n. increasing i by 1, and continuing to input the received $i^{th}$ initial picture into the first detection model.

9. The computing device according to claim 8, wherein inputting the received $i^{th}$ initial picture into the first detection model to obtain the initial location of each of the one or more target objects in the $i^{th}$ initial picture comprises:

inputting the received $i^{th}$ initial picture into the first detection model;

determining whether the $i^{th}$ initial picture comprises the one or more target objects;

in response to determining that the $i^{th}$ initial picture comprises the one or more target objects, obtaining the initial location of each of the one or more target objects in the $i^{th}$ initial picture; and in response to determining that the $i^{th}$ initial picture comprises no target object, increasing i by 1, and continuing to input the received $i^{th}$ initial picture into the first detection model.

10. The computing device according to claim 8, wherein inputting the target picture corresponding to the target location into the recognition model to obtain the one or more target objects in the $i^{th}$ initial picture comprises:

inputting the target picture corresponding to the target location into the recognition model; and in response to determining that a picture background of the $i^{th}$ initial picture does not meet a predetermined condition, determining the one or more target objects in an $(i-1)^{th}$ initial picture as the one or more target objects in the $i^{th}$ initial picture.

11. The computing device according to claim 8, wherein the computer executable instructions, when executed by the processor, further cause the processor to: after counting the one or more target objects in each initial picture:

determine, in response to determining that the one or more target objects in the $i^{th}$ initial picture does not meet a preset target object recognition rule, the one or more target objects in an $(i-1)^{th}$ initial picture as the one or more target objects in the $i^{th}$ initial picture.

12. The computing device according to claim 8, wherein the computer executable instructions, when executed by the processor, further cause the processor to: after counting the one or more target objects in each initial picture:

divide the one or more target objects in all initial pictures into at least one object sequence based on a preset time period;

determine a target object in each object sequence that does not meet a preset target object arrangement rule as an adjustment object; and adjust the adjustment object based on one or more target objects in an initial picture adjacent to an initial picture corresponding to the adjustment object.

13. The computing device according to claim 8, wherein the one or more target objects comprise a first target object and a second target object; and wherein the computer executable instructions, when executed by the processor, further cause the processor to: after counting the one or more target objects in each initial picture:

receive an obtaining request for the first target object;

determine the first target object and the second target object in each initial picture based on the obtaining request, wherein the second target object is associated with the first target object; and display, in response to updating the second target object in each initial picture based on an increase of the first target object, the first target object in each initial picture.

14. The computing device according to claim 8, wherein the computer executable instructions, when executed by the processor, further cause the processor to:

extract the one or more target objects from the initial picture;

determine an initial picture comprising a target object meeting a preset extraction condition as a target initial picture;

generate a target video based on the target initial picture; and send the target video to a user.

15. A non-transitory computer-readable storage medium storing computer instructions that, when executed by a processor, cause the processor to:

receive a to-be-processed video;

extract i video frames from the to-be-processed video as initial pictures based on a preset extraction rule, wherein i∈[1, n], and i is a positive integer;

input a received initial picture into a first detection model to obtain an initial location of each of one or more target objects in the initial picture, comprising:

inputting a received $i^{th}$ initial picture into the first detection model to obtain the initial location of each of the one or more target objects in the $i^{th}$ initial picture;

input a candidate picture corresponding to the initial location into a second detection model to obtain a verification object in the candidate picture and a verification location of the verification object in the candidate picture;

adjust the initial location of each or the one or more target objects based on the verification location to obtain a target location of each of the one or more target objects; and input a target picture corresponding to the target location into a recognition model to obtain the one or more target objects in the initial picture, comprising:

inputting the target picture corresponding to the target location into the recognition model to obtain the one or more target objects in the $i^{th}$ initial picture;

determining whether i is greater than n;

in response to determining that i is greater than n, counting the one or more target objects in each initial picture; and in response to determining that i is not greater than n, increasing i by 1, and continuing to input the received $i^{th}$ initial picture into the first detection model.

* * * * *